July 21, 1925.
F. J. BINSACK
CHILD'S VEHICLE
Filed Aug. 15, 1924
1,546,614
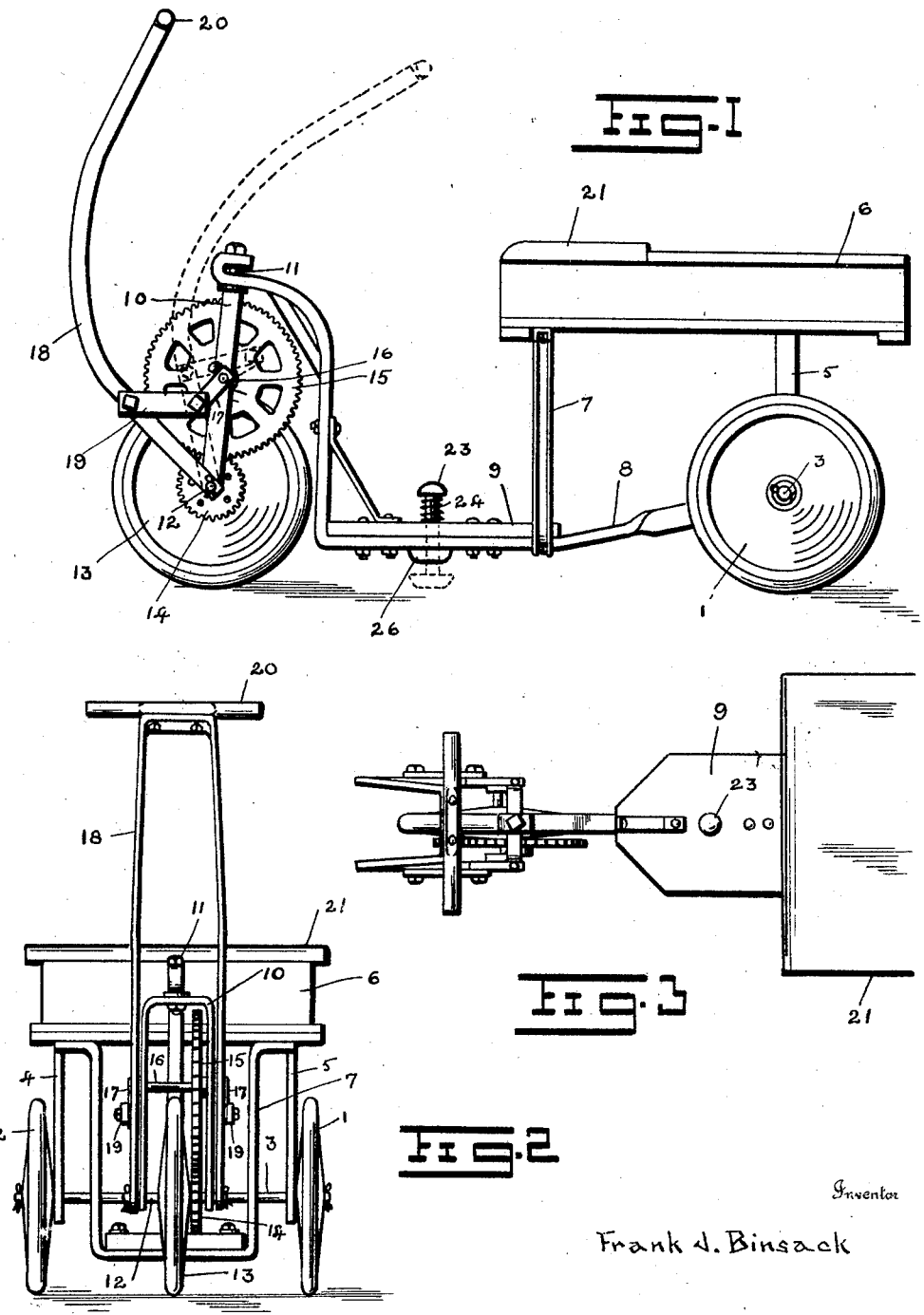

Patented July 21, 1925.

1,546,614

UNITED STATES PATENT OFFICE.

FRANK J. BINSACK, OF ROCHESTER, NEW YORK.

CHILD'S VEHICLE.

Application filed August 15, 1924. Serial No. 732,180.

*To all whom it may concern:*

Be it known that I, FRANK J. BINSACK, a citizen of the United States, residing at Rochester, in the county of Monroe and State of New York, have invented certain new and useful Improvements in Children's Vehicles, of which the following is a specification.

The object of this invention is to provide a new and improved type of child's vehicle.

Another object of this invention is to combine the steering and propelling apparatus for the vehicle to make it more readily operable by a child.

These and other objects of this invention will be fully illustrated in the drawing, described in the specification and pointed out in the claims at the end thereof.

In the accompanying drawing;

Figure 1 is a side elevation of the child's vehicle.

Figure 2 is a front elevation of the child's vehicle.

Figure 3 is a top plan view of the child's vehicle with the rear portion partly broken away.

In the several figures of the drawings like references indicate like parts.

The child's vehicle forming the subject matter of this invention is constructed in the form of a cart or coaster supported on three wheels, one supporting the front of the vehicle and the other two supporting the rear thereof.

As illustrated in the drawing the two rear wheels 1 and 2 are mounted on the axle 3. Vertical supporting members 4 and 5 extend upwardly from the axle 3 and support the box 6 of the vehicle at the rear. Depending from the front of the box 6 is a U-shaped bracket 7 which is connected at the bottom thereof with the axle 3 by the bracket 8. This bracket also extends forwardly of the yoke 7, first horizontally to form a support for the foot rest 9, and then upwardly and forwardly with a pivot bearing for the steering fork 10 provided at the outer end thereof.

The pivot bearing at the end of the brace is formed by bending the extreme end of the bracket 8 back on itself. The bearing drilled through the hookshaped end of the bracket thus extends thru two thicknesses of the bracket suitably spaced apart to form an elongated bearing for the pivot pin 11 to turn therein. This pivot or king pin is carried at the top of the steering fork 10 allowing this fork to readily turn at the end of the bracket 8. The steering fork carries the front axle 12 on which the front wheel 13 is mounted to rotate to support the front of the child's vehicle.

Keyed to the front wheel or otherwise suitably fastened thereto is the pinion 14. This pinion meshes with the gear 15 carried on the shaft 16. The shaft 16 in turn is mounted to rotate in the steering fork and supports the gear on the inside thereof in line with the pinion 14 with which is meshes. The outer ends of the shaft 16 project from either side of the steering fork 10 and have the cranks 17 keyed thereon. These cranks are connected to the bi-furcated handle 18 by means of the connecting links 19, 19. The handle 18 is pivoted to the ends of the axle 12 on the outside of the steering fork 10, and is adapted to swing back and forth thereon. A handle bar 20 is attached to the upper end of the bi-furcated handle 18 by means of which the handle is rocked back and forth by the child for the purpose of propelling the vehicle. This movement is indicated by the full and dotted line position of the handle 18 in Figure 1 and illustrates how on the swinging of the handle the cranks 17 are rotated thru the connecting links 19. The rotation of the cranks causes the rotation of the shaft 16 to which the cranks are keyed and this in turn rotates the gear 15 also carried on the shaft 16. The gear 15 meshes with the pinion 14 carried by the front wheel 13 so that on the rocking of the handle as above pointed out the train of gearing above described rotates the front wheel 13 which in turn propels the vehicle.

The child in operating the vehicle can set on the seat board 21 mounted on top of the box at the front end thereof and the feet of the child will rest on the foot rest 9 provided by a platform mounted on the horizontal section of the brace 8 and the bottom of the yoke 7.

A brake for stopping the vehicle is provided on the foot rest 9 and comprises a plunger that is mounted to vertically slide therein. A coil spring 24 surrounds the plunger 23 and normally holds the plunger in its upward position. The plunger carries at its lower end the brake shoe 26 that is adapted to make frictional contact with the ground over which the vehicle is driven. This is done by depressing the plunger 23 with the foot until the brake shoe 26 makes contact with the ground and causes a reduction in the speed of the vehicle or brings it to a dead stop.

I claim:

1. In a child's vehicle the combination of a seat, a pair of wheels supporting the rear of the child's vehicle seat, a bracket projecting forwardly of said seat, a steering fork pivoted on said bracket, an axle mounted in said steering fork, a third wheel mounted in said axle in said steering fork and supporting the front of the child's vehicle, a handle mounted to swing on said axle and means connecting the swinging handle with said third wheel to rotate said third wheel on the swinging of said handle, and turn said wheel on the swinging of said handle.

2. In a child's vehicle the combination of a seat, a pair of wheels supporting the rear of said child's vehicle, a bracket projecting forwardly of said box, a steering fork pivoted at the forward end of said bracket, a third wheel mounted to rotate in said steering fork, and supporting the front of said child's vehicle, a handle mounted to swing on said steering fork, a pinion carried by said third wheel, a gear mounted to rotate in said steering fork and meshing with said pinion, a crank carried by said gear and a connecting link connecting said crank with said swinging handle to rotate said third wheel on the swinging of said handle.

3. In a child's vehicle, the combination of a rear axle, a pair of wheels mounted to rotate on said axle, a bracket projecting forwardly and upwardly of said axle, a steering fork pivoted on the forward end of said bracket, an axle carried on said steering fork, a foot rest supported by said forwardly projecting bracket, a box supported behind said foot rest and above said pair of rear wheels, a third wheel mounted to rotate on said axle of said steering fork, a handle mounted to swing on said axle and means operated by said handle to rotate said third wheel on the swinging of said handle.

4. In a child's vehicle, the combination of a seat, a pair of wheels supporting said seat, a bracket projecting forwardly of said seat, a steering fork pivoted on the outer end of said bracket, a foot rest supported on said bracket intermediate of said steering fork and said seat, a shaft mounted in said steering fork, a wheel mounted on said shaft, a pinion carried by said wheel, a gear mounted to rotate on said fork and adapted to mesh with said pinion, a crank carried by said gear, a swinging lever pivoted on said shaft and a link connecting said lever with said crank, said lever being adapted to rotate said gear, pinion and wheel on the swinging thereof on the vertical plane, and turn said steering fork on the swinging thereof in a horizontal plane.

In testimony whereof I affix my signature.

FRANK J. BINSACK.